(12) United States Patent
Perry

(10) Patent No.: US 7,322,307 B1
(45) Date of Patent: Jan. 29, 2008

(54) BUOYANT BUMPER SYSTEM

(76) Inventor: George J. Perry, 440 SE. 15th Ave., Pompano Beach, FL (US) 33060

( * ) Notice: Subject to any disclaimer, the term of this patent is extended or adjusted under 35 U.S.C. 154(b) by 42 days.

(21) Appl. No.: 10/830,682

(22) Filed: Apr. 23, 2004

Related U.S. Application Data

(60) Provisional application No. 60/465,711, filed on Apr. 25, 2003.

(51) Int. Cl.
- E02B 3/26 (2006.01)
- B63B 59/02 (2006.01)
- B63B 21/00 (2006.01)

(52) U.S. Cl. ........ 114/219; 114/220; 114/230.2; 114/230.27; 405/213; 405/215

(58) Field of Classification Search ........ 114/219, 114/220, 230.1, 230.2, 230.25, 230.26, 230.27; 441/3; 405/212–216
See application file for complete search history.

(56) References Cited

U.S. PATENT DOCUMENTS

| | | | |
|---|---|---|---|
| 1,266,050 A * | 5/1918 | Reynolds | 405/211 |
| 2,844,943 A | 7/1958 | Kennedy | |
| 2,915,879 A * | 12/1959 | Besse | 405/212 |
| 3,001,371 A * | 9/1961 | Gilmore, Jr. et al. | 405/195.1 |
| 3,145,685 A * | 8/1964 | Kulick, Sr. | 114/220 |
| 3,401,413 A * | 9/1968 | Anselmi | 441/25 |
| 3,430,598 A * | 3/1969 | Soderberg | 114/230.27 |
| 3,486,342 A * | 12/1969 | Aks | 405/212 |
| 3,695,209 A * | 10/1972 | Giese | 114/230.24 |
| 3,830,187 A * | 8/1974 | McGahee | 114/230.27 |
| 3,842,779 A * | 10/1974 | Jaynes | 114/230.24 |
| 4,357,891 A | 11/1982 | Sluys | |
| 4,679,964 A * | 7/1987 | Blandford | 405/216 |
| 4,726,313 A * | 2/1988 | Neal | 114/230.27 |
| 4,804,296 A | 2/1989 | Smath | |
| 4,817,552 A * | 4/1989 | Poldervaart | 114/230.27 |
| 5,007,363 A | 4/1991 | James | |
| 5,014,638 A | 5/1991 | Ilves et al. | |
| 5,467,727 A * | 11/1995 | Godvin et al. | 114/230.27 |
| 5,603,280 A | 2/1997 | Shackelford, Jr. | |
| 5,937,781 A * | 8/1999 | Isella et al. | 114/230.26 |
| 6,062,158 A | 5/2000 | Blanchard | |
| 6,427,411 B2 * | 8/2002 | Shows | 52/515 |

FOREIGN PATENT DOCUMENTS

FR 2695903 A1 * 3/1994

* cited by examiner

*Primary Examiner*—Ajay Vasudeva
(74) *Attorney, Agent, or Firm*—Gold & Rizvi, P.A.; H. John Rizvi; Glenn E. Gold

(57) ABSTRACT

A buoyant bumper system for attachment to a docking facility and cushioning a boat. The buoyant bumper system includes an elongated travel shaft for engaging the docking facility, a travel sleeve slidably carried by the travel shaft, a system float carried by the travel sleeve and a resilient bumper carried by the travel sleeve in spaced-apart relationship to the system float. Throughout tidal rise and fall of a water body, the system float maintains the bumper at a fixed level with respect to the boat. Therefore, the buoyant bumper system is capable of cushioning and preventing damage to the boat throughout a full range of tidal movement as the boat is docked to a docking facility.

6 Claims, 2 Drawing Sheets

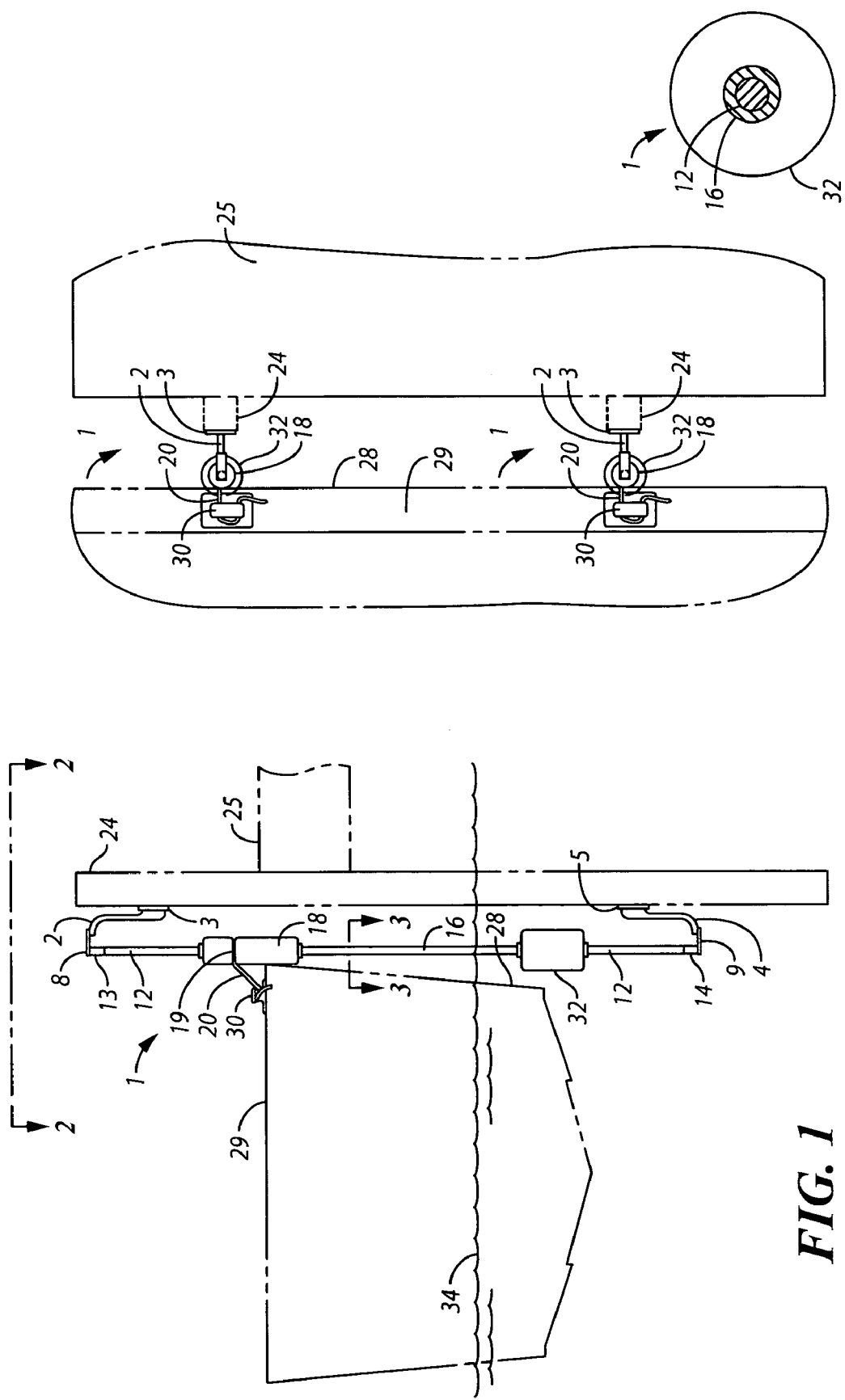

BUOYANT BUMPER SYSTEM

CROSS-REFERENCE TO RELATED APPLICATIONS

This application claims the benefit of U.S. provisional patent application No. 60/465,711, filed Apr. 25, 2003.

BACKGROUND OF THE INVENTION

1. Field of the Invention

The present invention relates generally to boating accessories. More particularly, the present invention relates to a buoyant bumper system for preventing damage to a boat floating on a water body when the boat is docked.

2. Description of the Prior Art

During the period in which a boat floating on a water body is secured to a dock, the rising and falling of the tide frequently causes the hull of the boat to contact either the vertical posts (pilings) of the dock which secure the dock to the lakebed or the horizontal planking (deck) that forms the surface of the dock which provides access to the boat. Docks are typically constructed with the pilings close together such that they are the primary points of contact between the moored boat and the dock. This minimizes damage to either the boat or the dock when the boat inadvertently strikes the dock. Because the dock is fixed and stable in the lakebed and the moored boat floats on the surface of the water, any type of wave action, generated either by the wind or by the passing of other boats, will cause the hull of the boat to bounce against the vertical posts of the dock, potentially damaging both the dock and the boat. The cost of repairing a wooden dock structure may not be excessive, but the work involved is substantial. The cost of repairing damage to an expensive boat may be very expensive, and the resale value of the boat will be substantially reduced.

A boat bumper is a conventional device that fits between the boat dock and the moored boat such that neither the boat nor the dock will suffer damage when the moving boat encounters the dock structure. The boat bumper is therefore one of the most important accessories in the rapidly-growing recreational boating arena. The protection of the boat and the dock is vital to continued enjoyment of this recreational activity.

Boat bumpers or bumpers are available in two basic groups. One group attaches to the side or gunwale of the boat. The other group attaches to the vertical posts or pilings of the dock. Generally, the first group of bumper is fairly rigidly attached to the side or gunwale of the boat and is made of a flexible, deformable material. The material is capable of absorbing the shock of the boat striking the dock. The problem with this type of bumper, however, is that each bumper must be specifically manufactured for a particular shape of the boat gunwale.

An example of the second group of bumper, which attaches to the piling of the dock, is disclosed in U.S. Pat. No. 5,762,016. In this assembly, a deformable bumper portion is attached to the piling such that the bumper can slide up and down the piling. In this configuration, the deformable bumper is capable of being placed in a position to protect the boat and dock.

U.S. Pat. No. 3,486,342 discloses a pile mooring bumper. The bumper base is formed of a floatable material, such that the bumper can float on the surface of a water body, rising and falling with the tides. However, the pile mooring bumper of the '342 patent can only be used on pylons. Each pylon must be a stand-alone pylon such that the bumper can slide onto the pylon. Furthermore, the bumper and line are non-adjustable.

U.S. Pat. No. 5,007,363 discloses a buoyant marine bumper element having guides for securing it to a mooring facility such as a piling. The bumper element rises and falls with the tide or waves as a result of its buoyancy. The bumper element is cylindrical in form and sealed at each end by an enlarged end cap, which serves as a stop element for limiting up-and-down movement upon contacting a guide element. However, the floater and bumper of the device are combined into a single element.

U.S. Pat. No. 5,603,280 discloses a boat mooring apparatus which includes a track mounted to a piling. A carriage is mounted for movement within the track and an elongated rod is connected thereto. A mooring ring is mounted to the carriage or the rod. A float is mounted on the lower end of the rod so that when the entire assembly floats up and down with the tide, the relationship between a boat moored thereto and the mooring ring is independent of the tide. However, the apparatus disclosed in the '280 patent has no bumper to cushion the impact of a boat against the apparatus during docking.

The most common type of boat bumper currently available is a cylindrical, elongated tube, rounded at both ends and made of a resilient deformable material to absorb the impact of the boat against the dock structure. One end or both ends of the tube can be attached to a rope such that the bumper can be fastened to the boat or the dock. A disadvantage of this type of bumper is that, when the boat pitches or rolls against the bumper due to wave action, the bumper can be easily dislodged from its position between the boat and the dock, thus allowing the boat to strike the dock. When deformed, the cylinder can absorb and dissipate more force than can other shapes. If the boater carries the bumpers from one dock to another, the rounded shape of the bumper is easy to transport and not dangerous to a person should it roll around in the boat during transit. The cylinder is an excellent shape for a bumper, but a problem with the cylinder involves maintaining the bumper in the correct position between the boat and the dock to effectively perform its desired function.

At present, there is no practical buoyant bumper system that includes a lower bumper float which is positioned at the surface of a water body and rises and falls with the surface. Accordingly, there is needed a buoyant bumper system which includes a lower bumper float engaged to an adjustable sleeve that is connected to an upper bumper bumper for attachment of a bumper line to a boat, such that the upper bumper bumper follows the movements of the lower bumper float while the assembly is attached to a dock piling, thereby avoiding the deficits of the prior art.

SUMMARY OF THE INVENTION

The present invention is directed to a buoyant bumper system for preventing damage to a boat floating on a water body when the boat is docked.

An object of the present invention is to provide a buoyant bumper system that provents damage to a boat throughout the tidal rise and fall of a water body when the boat is docked thereon.

A further object of the present invention is to provide a buoyant bumper system wherein a protective bumper moves vertically with the tidal rise and fall of a water body to ensure that the protective bumper remains at a protective position with respect to the boat at all water levels.

Another object of the present invention is to provide a buoyant bumper system which is capable of attachment to a conventional docking facility.

An additional object of the present invention is to provide a buoyant bumper system including a system float and a protective bumper that are provided on a common travel sleeve which rises and falls with the water level of a water body to ensure protection of a boat at all water levels when the boat is attached to a docking facility.

Yet another object of the present invention is to provide a buoyant bumper system which is adaptable to protecting boats of various sizes and description during docking of the boats.

A further object of the present invention is to provide a buoyant bumper system which includes an elongated, vertical travel shaft on which is slidably mounted a travel sleeve; a protective bumper and a system float mounted on the travel sleeve; and a mechanism for connecting the protective bumper to the boat during docking of the boat to a docking facility.

Another object of the present invention is to provide a buoyant bumper system which includes a protective bumper which rises and falls with the tidal rise and fall of a water body and is connected to a boat to protect the boat from inadvertently striking a docking facility responsive to tidal movement of the water body.

An additional object of the present invention is to provide a buoyant bumper system that can be readily attached to a vertical piling or post of a docking facility.

Yet another object of the present invention is to provide a buoyant bumper system which may include a pair of vertically-spaced support arms for attachment to a docking facility; an elongated travel shaft vertically spanning the support arms; a travel sleeve slidably mounted on the travel shaft; and a protective bumper and a system float provided on the travel sleeve, which protective bumper is attached to a boat during docking of the boat to prevent the boat from being damaged by inadvertently striking the docking facility and the system float ensures proper positioning of the protective bumper with respect to the boat throughout the tidal rise and fall of the water body.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1 is a side view of the buoyant bumper system in accordance with the present invention, mounted on a dock piling of a dock (shown in phantom) and attached to a boat (also shown in phantom);

FIG. 2 is a top view of a pair of buoyant bumper systems provided on a dock in spaced-apart relationship to each other, in typical application of the invention;

FIG. 3 is a cross-sectional view taken along section lines 3-3 in FIG. 1;

DETAILED DESCRIPTION OF THE PREFERRED EMBODIMENTS

Figure 5:
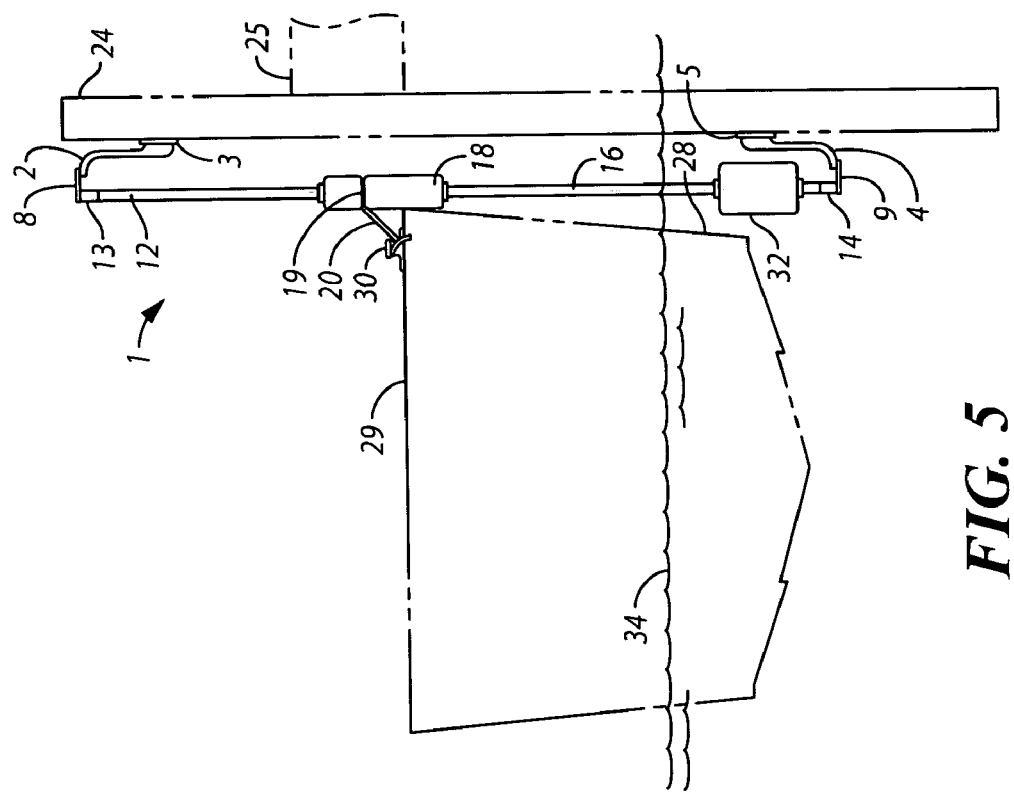
FIG. 5 is a side view of the buoyant bumper system, more particularly illustrating a low-tide position of the system.

Shown throughout the Figures, the present invention is generally directed towards a buoyant bumper system which is capable of preventing damage to a boat throughout a full range of tidal movement as the boat is docked to a docking facility.

Referring to FIGS. 1-5, an illustrative embodiment of the buoyant bumper system of the present invention is generally indicated by reference numeral 1. The buoyant bumper system 1 can be mounted on a vertical piling 24, for example, of a docking facility 25 which is located on or at the edge of a water body 34 such as a lake, river or ocean, for example. The docking facility 25 may have a conventional structure and typically includes multiple pilings 24 which are located in parallel, spaced-apart relationship with respect to each other, as illustrated in FIG. 2.

As shown in FIG. 1, the buoyant bumper system 1 typically includes a generally "S"-shaped upper support arm 2 having an upper arm mount bracket 3 which is adapted to be mounted to the piling 24. The buoyant bumper system 1 typically further includes a generally "S"-shaped lower support arm 4 which may be the same in design as the upper support arm 2. The lower support arm 4 typically includes a lower arm mount bracket 5 which is adapted to be mounted to the piling 24, beneath and in spaced-apart relationship to the upper arm mount bracket 3. Accordingly, when mounted on the piling 24, the upper support arm 2 and lower support arm 4 are typically mirror-images of each other.

An upper shaft mount bracket 8 extends generally horizontally from the upper support arm 2, and a lower shaft mount bracket 9 in like manner extends generally horizontally from the lower support arm 4. An upper shaft insert 13 extends downwardly from the upper shaft mount bracket 8, and a lower shaft insert 14 extends upwardly from the lower shaft mount bracket 9. An elongated travel shaft 12 extends vertically between the upper shaft insert 13 and the lower shaft insert 14. An elongated travel sleeve 16 is slidably mounted on the travel shaft 12, as shown in cross-section in FIG. 3, between the upper shaft insert 13 and the lower shaft insert 14. The travel sleeve 16 is capable of slidably traversing the entire length of the travel sleeve 12, between the upper shaft insert 13 and the lower shaft insert 14.

An elongated, typically cylindrical bumper 18, which is preferably a firm and yet resilient material such as foam rubber, for example, is mounted on the travel sleeve 16, beneath and in spaced-apart relationship to the upper shaft insert 13. The bumper 18 typically includes a circumferential line groove 19 that circumscribes the travel sleeve 16. A bumper line 20, which may be nylon, for example, is tied or otherwise attached to the travel sleeve 16 and extends through the line groove 19 for attachment to a boat cleat 30, for example, on the deck 29 of a boat 28, as will be hereinafter further described.

Figure 4:
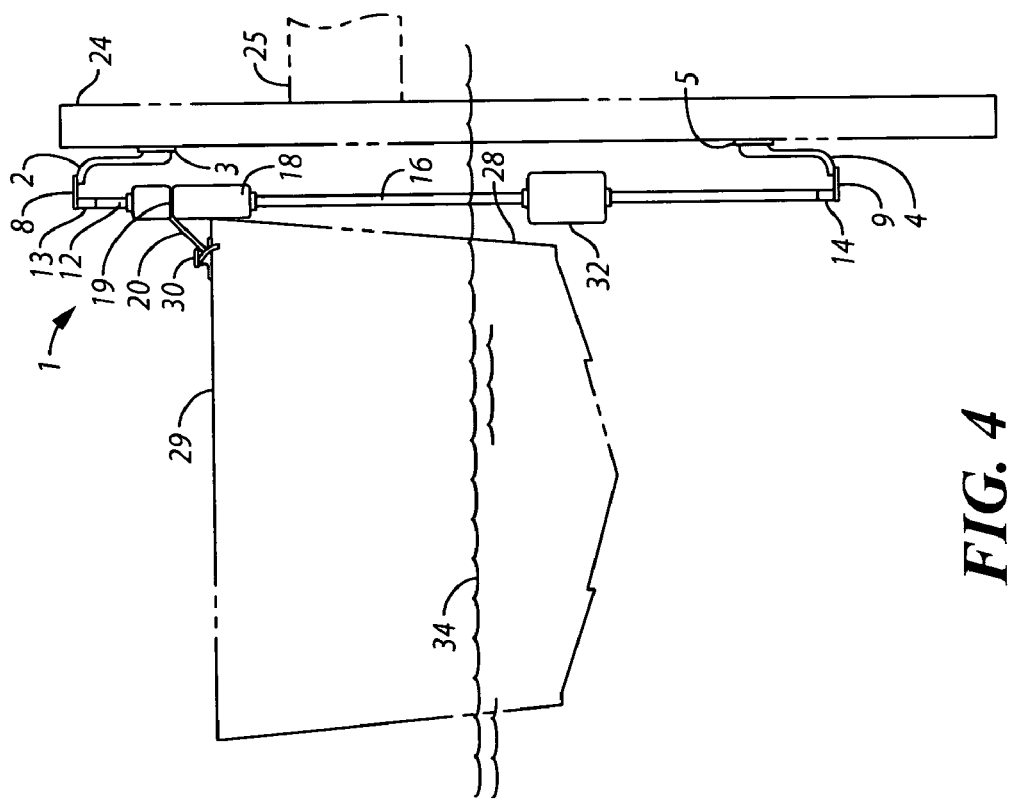
FIG. 4 is side view of the buoyant bumper system in accordance with the present invention, more particularly illustrating a high-tide position of the system.

A system float 32 is provided on the travel sleeve 16, beneath and in spaced-apart relationship to the bumper 18. The system float 32 is typically STYROFOAM (trademark) or other buoyant material and floats at or near the surface of the water body 34 when the buoyant bumper system 1 is mounted on the piling 24 of the docking facility 25. Accordingly, the travel sleeve 16, with the bumper 18 and system float 32 mounted thereon, is capable of sliding vertically on the travel shaft 12, between the upper shaft insert 13 and lower shaft insert 14, depending on the height of the surface of the water body 34. Therefore, the travel sleeve 16 can travel to an upper position on the travel shaft 12 when the water body 34 is at high tide, as illustrated in FIG. 4; to a lower position on the travel shaft 12 when the water body 34 is at low tide, as illustrated in FIG. 5; and to any intermediate position, as shown in FIG. 1, depending on the level of the water body 34. The spacing distance of the bumper 18 with respect to the system float 32 is typically selected in such a manner that the distance between the system float 32 and the line groove 19 of the bumper 18 generally corresponds to the distance between the surface of the water body 34 and the boat deck 29 of a boat 28 to be moored to the buoyant bumper system 1.

As shown in FIG. 2, in a preferred application of the invention, two buoyant bumper systems 1 are mounted on respective adjacent pilings 24 of the docking facility 25. A boat 28 (shown in phantom) is moored to each buoyant bumper system 1 by tying the bumper line 20 of each buoyant bumper system 1 to a corresponding one or multiple boat cleats 30 which are typically mounted in spaced-apart relationship to each other on the deck 29 of the boat 28. It will be appreciated by those skilled in the art that, regardless of the tide level of the water body 34, the bumper 18 remains at substantially the same level as the boat cleat 30 as the boat 28 remains moored to the buoyant bumper systems 1. Accordingly, at high tide of the water body 34, as shown in FIG. 4, the boat 28 floats at a correspondingly high level with respect to the docking facility 25. The system float 32 floats at or near the surface of the water body 34, in such a manner that the travel sleeve 16 is positioned at a relatively high position on the travel shaft 12, and therefore, maintains the bumper 18 at or near the level of the boat deck 29. Conversely, at a low tide of the water body 34, as shown in FIG. 5, the travel sleeve 16 is positioned at a relatively low position on the travel shaft 12, wherein the bumper 18 remains at or near the level of the boat deck 29. Therefore, at every tide level of the water body 34, the bumper 18 remains in a position which is at or near the level of the boat deck 29.

As the boat 28 remains moored to the buoyant bumper systems 1, wave action in the water body 34 frequently tends to rock the boat 28. This may cause the boat 28 to strike the resilient bumper 18 on each buoyant bumper system 1. Therefore, each bumper 18, spaced from the piling 24 of the docking facility 25, prevents the boat from inadvertently striking the piling 24 or other elements of the docking facility 25. Thus, the resilient bumpers 18 on the respective buoyant bumper systems 1 absorb the impact energy of the striking action of the boat 28, thereby preventing scratching or other damage to the boat 28 from occurring. Moreover, the bumper lines 20 keep the boat 28 securely fastened to the buoyant bumper systems 1 as long as the boat 28 is docked to the docking facility 25.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A buoyant bumper system for attachment to a docking facility and cushioning a boat, comprising:
   a pair of generally S-shaped upper and lower support arms, respectively, for attachment to the docking facility;
   an elongated travel shaft spanning said upper and lower support arms for engaging the docking facility;
   a travel sleeve slidably carried by said travel shaft;
   a system float carried by said travel sleeve; and
   a resilient bumper carried by said travel sleeve in spaced-apart relationship to said system float.

2. The buoyant bumper system of claim 1 further comprising a bumper line carried by said bumper for attachment of said bumper to the boat.

3. The buoyant bumper system of claim 2 further comprising a line groove provided in said bumper and wherein said bumper line is attached to said travel sleeve and extends from said bumper through said line groove.

4. The buoyant bumper system of claim 3 wherein said bumper is cylindrical.

5. The buoyant bumper system of claim 1 wherein said bumper is cylindrical.

6. The buoyant bumper system of claim 5 further comprising a bumper line carried by said bumper for attachment of said bumper to the boat.

* * * * *